US009551793B2

(12) United States Patent
Huang et al.

(10) Patent No.: US 9,551,793 B2
(45) Date of Patent: Jan. 24, 2017

(54) ORDERING STRUCTURE OF SCINTILLATOR AND FABRICATION METHOD

(71) Applicant: NATIONAL CHUNG-SHAN INSTITUTE OF SCIENCE AND TECHNOLOGY, Taoyuan (TW)

(72) Inventors: Ker-Jer Huang, Taoyuan (TW); Deng-Horng Tsai, Taoyuan (TW); Tsan-Nan Yang, Taoyuan (TW); Soon-Lin Chen, Taoyuan (TW); Chien-Chon Chen, Taoyuan (TW)

(73) Assignee: NATIONAL CHUNG-SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 229 days.

(21) Appl. No.: 14/312,251

(22) Filed: Jun. 23, 2014

(65) Prior Publication Data
US 2014/0299479 A1    Oct. 9, 2014

Related U.S. Application Data

(62) Division of application No. 13/711,615, filed on Dec. 12, 2012, now Pat. No. 9,316,742.

(51) Int. Cl.
*C25D 11/02* (2006.01)
*G01T 1/20* (2006.01)
(Continued)

(52) U.S. Cl.
CPC ............... *G01T 1/003* (2013.01); *B44C 1/227* (2013.01); *C23C 18/1616* (2013.01);
(Continued)

(58) Field of Classification Search
CPC .................................. G01T 1/003; C25D 11/02
See application file for complete search history.

(56) References Cited

U.S. PATENT DOCUMENTS 3,825,787 A      7/1974   Doolittle
5,981,959 A  *  11/1999   Apte ..................... G01T 1/2018
                                                   250/367
(Continued)

OTHER PUBLICATIONS

Chang et al. Fabrication of Csl Nanocrystals on the AAo Template by Liwuid Phase Deposition Method, Dec. 10-11, 2012 pp. 1-2.
(Continued)

*Primary Examiner* — Bryan D. Ripa
(74) *Attorney, Agent, or Firm* — Anova Law Group, PLLC

(57) ABSTRACT

An ordering structure scintillator of scintillator and fabrication method is disclosed. The ordering structure scintillator of scintillator comprises: a tubular template, which consists of a plurality of thin film oxidized metal tubes; a plurality of scintillators, filled in the thin film oxidized metal tubes; and a package layer, formed on the surface of the tubular template for protecting the tubular template. In addition, through the fabrication method, the ordering structure scintillator of scintillator can be made by anodic treatment and die casting technology with low cost and rapid production; moreover, the film oxidized metal tubes of the tubular template can be further manufactured to nano tubes by adjusting electrolyte composition, electrolysis voltage, and processing time of anodic treatment, and the aperture size, the thickness and the vessel density of the nano tube can be controlled and ranged from 10 nm to 500 nm, 0.1 μm to 1000 μm, and $10^8$ to $10^{12}$ tube/cm$^2$, respectively.

14 Claims, 16 Drawing Sheets

(51) Int. Cl.
  *G01T 1/00*  (2006.01)
  *C25D 1/02*  (2006.01)
  *B44C 1/22*  (2006.01)
  *C23C 18/18*  (2006.01)
  *C23C 18/16*  (2006.01)
  *C25D 11/04*  (2006.01)
  *C25D 11/08*  (2006.01)
  *C25D 11/12*  (2006.01)
  *C25D 11/16*  (2006.01)
  *C25D 11/24*  (2006.01)
  *C25D 11/26*  (2006.01)
  *C25F 3/20*  (2006.01)
  *C23C 18/36*  (2006.01)
  *C23G 1/12*  (2006.01)
  *G01T 1/202*  (2006.01)

(52) U.S. Cl.
  CPC .......... *C23C 18/1879* (2013.01); *C23C 18/36* (2013.01); *C23G 1/125* (2013.01); *C25D 1/02* (2013.01); *C25D 11/045* (2013.01); *C25D 11/08* (2013.01); *C25D 11/12* (2013.01); *C25D 11/16* (2013.01); *C25D 11/24* (2013.01); *C25D 11/26* (2013.01); *C25F 3/20* (2013.01); *G01T 1/202* (2013.01); *G01T 1/2006* (2013.01)

(56) References Cited

U.S. PATENT DOCUMENTS

| 7,863,579 | B2 | 1/2011 | Suhami |
| 2006/0202125 | A1 | 9/2006 | Suhami |
| 2010/0272234 | A1 | 10/2010 | Morse et al. |
| 2011/0034339 | A1* | 2/2011 | Goyal .................... B82Y 10/00 505/237 |
| 2011/0122994 | A1* | 5/2011 | Grubsky ................... G01T 1/20 378/62 |
| 2011/0144566 | A1 | 6/2011 | Dacey et al. |
| 2014/0110587 | A1 | 4/2014 | Ohashi et al. |

OTHER PUBLICATIONS

Taheri et al., Geant4 simulation of zinc oxide nanowires in anodized aluminum oxide template as a low energy X-ray scintillator detector, available online Oct. 30, 2012, Nuclear instruments and Methods in Physics Research A, pp. 30-36.

USPTO, final office action mailed Oct. 16, 2014 for U.S. Appl. No. 13/711,615 (parent application).

USPTO, 1st advisory office action mailed Dec. 26, 2014 for U.S. Appl. No. 13/711,615 (parent application).

USPTO, 2nd advisory office action mailed Feb. 10, 2015 for U.S. Appl. No. 13/711,615 (parent application).

USPTO, notice of allowance mailed Apr. 13, 2015 for U.S. Appl. No. 13/711,615 (parent application).

USPTO, restriction requirement mailed Apr. 10, 2014 for U.S. Appl. No. 13/711,615 (parent application).

USPTO, non-final office action mailed Jun. 10, 2014 for U.S. Appl. No. 13/711,615 (parent application).

* cited by examiner

ORDERING STRUCTURE OF SCINTILLATOR AND FABRICATION METHOD

BACKGROUND OF THE INVENTION

1. Technical Field

The present invention relates to a scintillator structure and a manufacturing method thereof, and more particularly, to a scintillator with sub-micron column structure and a manufacturing method for making the same, wherein the manufacturing method is used for making the scintillator with sub-micron column structure, and the scintillator with sub-micron column structure is able to transform the X-ray to a visible light for being applied in medical equipments, nuclear medicine, and security detection technologies.

2. Description of Related Art

Scintillator is a product of high-energy physics technology, which is used for transforming X-ray to an electronic signal or a visible light; therefore, the visible light transformed from X-ray can be further converted to an electronic signal by conventional optics device, for example, charge-coupled device (CCD). The scintillation occurring in the scintillator is a fluorescence induced by radiation. When a high-energy wave irradiates the scintillator, the ground state electrons in the scintillator would be excited and then migrate from ground state to excited state. Therefore, those excited electrons can further migrate to light-emitting excited state through non-light-emitting way, and then decay to lower energy state or base state for emitting photons (400~1100 nm). Since crystalline scintillator includes high energy gap, the photons still cannot be effectively emitted although large electrons in conduction band migrate to valence band, or, the emitted photons cannot become visible light due to there high energy. Therefore, for increasing the emitting efficiency of visible light, a small amount of the activator is doped into crystalline scintillator for reducing the energy gap.

Because scintillator is able to transform X-ray to visible light, it is widely applied in medical equipments, nuclear medicine, and security detection technologies. Currently, Scintillators are divided into CsI scintillator, CsI(Na) scintillator and CsI(Tl) scintillator, wherein the CsI scintillator has been became the most conventionally used scintillator for its advantages of easy to be process, large size, sensitive to radiation, and high light-emitting efficiency. Generally, a good scintillator includes the following properties:
(1) transforming a radiation wave to a detectable light by high scintillation effect;
(2) linear transform;
(3) the production of the detectable light is proportional to energy of the radiation wave;
(4) including transparency and low self-radioactivity; and
(5) short light-decaying time.

Moreover, various application fields demand different requirements to the scintillators on incident radiation energy (keV), reaction time (ms), thickness (μm), area (cm$^2$), and spatial resolution (lp/mm), and these requirements are listed in following table 1.

TABLE 1

|  | crystal structurology | Mammography | Tooth Image | Non-destructive inspection | Astronomy |
| --- | --- | --- | --- | --- | --- |
| incident radiation energy (keV) | 8~20 | 20~30 | 50~70 | 30~400 | 30~600 |
| reaction time (ms) | <0.5 | <0.1 | <1 | <0.1 | <0.05 |
| thickness (μm) | 30~50 | 100~150 | 70~120 | 70~1000 | 70~2000 |
| area (cm$^2$) | 30 × 30 | 20 × 25 | 2.5 × 3.5 | 10 × 10 | 30 × 30 |
| spatial resolution (lp/mm) | 10 | 15~20 | 7~10 | 5~10 | 4~5 |

So that, according to above table, it can know that the incident radiation energy, the thickness and the spatial resolution will affect the light-outputting quality of the scintillator. Moreover, the signal to noise ratio (SNR) of scintillator increases with the incensement of the thickness thereof, and the SNR can be calculated by formula of $SNR^2 = N_0 \times [1 - \exp^{(-\alpha \times d)}]$, where the $N_o$, $\alpha$, d respectively present the incident photon number, incident energy, and thickness of scintillator.

In addition, anodic treatment is conventionally applied in surface corrosion resistance, painting, electrical insulation, electroplating, and wear resistance. The anodic oxide film made by anodic treatment usually includes porous structure, therefore a post sealing process must be applied to the anodic oxide film for facilitating the anodic oxide film become a dense membrane. Anodic treatment has the advantages of low cost and rapid production, and capable of being applied in producing large area products, such as dye-sensitized solar cells, thermal conductive sheets and thermal insulating components. Besides the anodic treatment, die casting process is also a low cost, rapid production technology.

On the other hand, traditional CsI scintillator process would cause some drawbacks in the CsI scintillator, for example, yellow discolouration, air pores, cloudiness, etc., and the yellow discolouration, the air pores and the cloudiness would impact the output of visible light and further reduce the efficiency of the CsI scintillator. In scintillator, the yellow discolouration is resulted from the combination of oxygen ions and thallium ions in the surface of scintillator, the air pores are caused by air or impurity remaining in the scintillator, and the cloudiness is an atomization induced by gathering of small oxygen bubbles.

According to the traditional CsI scintillator process includes many drawbacks, the semiconductor process technologies are used for manufacturing the scintillators, which includes the steps of: firstly, forming micron tube array on a silicon substrate by way of deep reactive ion etching (DRIE) or laser drilling, wherein the micron tube array is used as a waveguide film, and includes an aspect ratio of 20~25 and a tube diameter of few microns. Next, vapor (or liquid) deposition is used for filling CsI material into the micron tube array, so as to complete a CsI scintillator. However, the mask, lithography, exposure, etching, and crystal growth equipments adopted in semiconductor process technology result in high manufacturing time and cost to CsI scintillator.

Accordingly, in view of the traditional CsI scintillator process and the semiconductor process technology for making CsI scintillator still have shortcomings and drawbacks, the inventor of the present application has made great efforts to make inventive research thereon and eventually provided a scintillator with sub-micron column structure and a manufacturing method thereof, wherein the anodic treatment and the die casting technology having the advantages of low cost and rapid production are utilized for manufacturing a high-value scintillator with sub-micron column structure, and this scintillator with sub-micron column structure can also be applied in medical equipments, nuclear medicine, and security detection technologies.

BRIEF SUMMARY OF THE INVENTION

The primary objective of the present invention is to provide a scintillator with sub-micron column structure, which is capable of being manufactured by way of anodic treatment and die casting technology with low cost and rapid production, therefore this scintillator with sub-micron column structure includes the advantages of low manufacture-processing time, low cost and simple manufacturing process.

Accordingly, to achieve the primary objective of the present invention, the inventor proposes a scintillator with sub-micron column structure, comprising: a tubular template, having a plurality of thin film oxidized metal tubes; a plurality of scintillators, filled in the thin film oxidized metal tubes; and a package layer, formed on the surface of the tubular template for protecting the scintillators from being damaged by water vapor and oxygen. Moreover, the aforesaid scintillator with sub-micron column structure further comprises a reflective layer formed on the inner walls of the thin film oxidized metal tubes.

The another objective of the present invention is to provide a method for manufacturing scintillator with sub-micron column structure, through the manufacturing method, the scintillator with sub-micron column structure can be made by anodic treatment and die casting technology with low cost and rapid production; moreover, the film oxidized metal tubes of the tubular template can be further manufactured to nano tubes by adjusting electrolyte composition, electrolysis voltage, and processing time of anodic treatment, and the aperture size, the thickness and the vessel density of the nano tube can be controlled and ranged from 10 nm to 500 nm, 0.1 μm to 1000 μm, and $10^8$ to $10^{12}$ tube/cm$^2$, respectively.

So that, for achieving the another objective of the present invention, the inventor proposes a method for manufacturing scintillator with sub-micron column structure, comprising the steps of:
(1) fabricating a tubular template having a plurality of thin film oxidized metal tubes by processing an anodic treatment;
(2) adjusting the tube diameter of the thin film oxidized metal tubes by a chemical etching process;
(3) forming a thin film scintillator on the inner walls of the thin film oxidized metal tubes by a chemical impregnation process;
(4) filling a liquid phase of scintillator material into the thin film oxidized metal tubes by a die casting process, so as to form a scintillator column in each thin film oxidized metal tube; and
(5) forming a package layer on the surface of the tubular template.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe a scintillator with sub-micron column structure and a manufacturing method thereof according to the present invention, embodiments of the present invention will be described in detail with reference to the attached drawings hereinafter.

Figure 1:
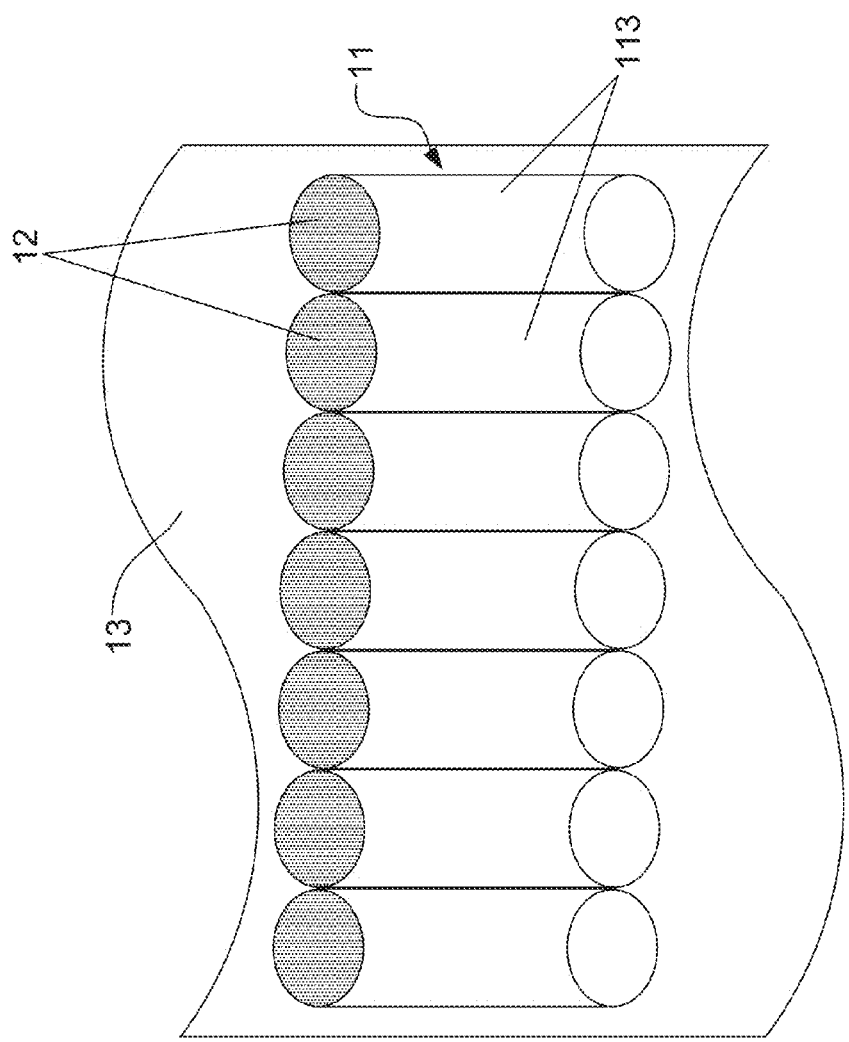
FIG. 1 is a framework view of a scintillator with sub-micron column structure according to the present invention.

Please refer to FIG. 1, which illustrates a framework view of a scintillator with sub-micron column structure according to the present invention. As shown in FIG. 1, the scintillator with sub-micron column structure 1 mainly includes a tubular template 11, a plurality of scintillators 12 and a package layer 13, wherein the tubular template 11 consists of a plurality of thin film oxidized metal tubes 113, the scintillators 12 are respectively filled in the thin film oxidized metal tubes 113, and the package layer 13 is formed on the surface of the tubular template 11 for protecting the scintillators 12 from being damaged by water vapor and oxygen. In the present invention, the package layer 13 can be a polymer, a metal, a ceramic, or a combination thereof, and the package layer 13 is formed on the surface of the tubular template 11 by spin coating, vapor deposition, sputtering, or combination process thereof. In addition, the manufacturing material of the scintillator 12 can be cesium iodide (CsI), cesium iodide with doped sodium (CsI(Na)) or cesium iodide with doped thallium (CsI(Tl)).

Moreover, for increasing the efficiency of the scintillators 12 to an external high-energy wave (for example, X-ray), it can further form a reflective film on the inner walls of the thin film oxidized metal tubes 113; therefore, the direct light or the refracted light with small refraction angle of the incident X-ray may efficiently get into a CCD device located under the scintillators 12. In the present invention, the material of the reflective layer can be nickel, zirconium, titanium, iron, cobalt, tungsten, copper, aluminum, and alloy made of these materials.

Furthermore, for increasing the mechanical properties of the tubular template 11, a strengthening layer (not shown) can be formed on the bottom of the tubular template 11 when manufacturing this scintillator with sub-micron column structure 1; thus, it is able to avoid the thin film oxidized metal tubes 113 from being damaged when moving the tubular template 11 or filling the CsI into the thin film oxidized metal tubes 113. In the present invention, the material of the strengthening layer can be Nickel, zirconium, titanium, iron, cobalt, tungsten, and alloy made of these materials. Besides, it needs to further explain that, after completing the die casting process of the scintillators 12 under a vacuum or a non-vacuum environment, the strengthening layer can be next removed by chemical dissolution process.

In the scintillator with sub-micron column structure 1 of the present invention, the tubular template 11 is manufactured by way of processing an anodic treatment to a metal substrate; moreover, the thin film oxidized metal tubes 113 of the tubular template 11 can be $ZrO_2$, $TiO_2$, $Al_2O_3$, $Ta_2O_5$, or $Nb_2O_3$ according to different metal substrates, wherein the thin film oxidized aluminum tubes ($Al_2O_3$) is also called as anodic aluminum oxide (AAO), anodic alumina nanoholds (AAN), anodic alumina membrane (AAM), or porous anodic alumina (PAA). In addition, by controlling the manufacturing parameters, the film oxidized metal tubes 113 of the tubular template 11 can be manufactured and include a specific tube diameter ranged from 10 nm to 500 nm, a specific thickness ranged from 5 μm to 1000 μm and a specific tube density ranged from $10^8$ tube/$cm^2$ to $10^{12}$ tube/$cm^2$.

Figure 2:
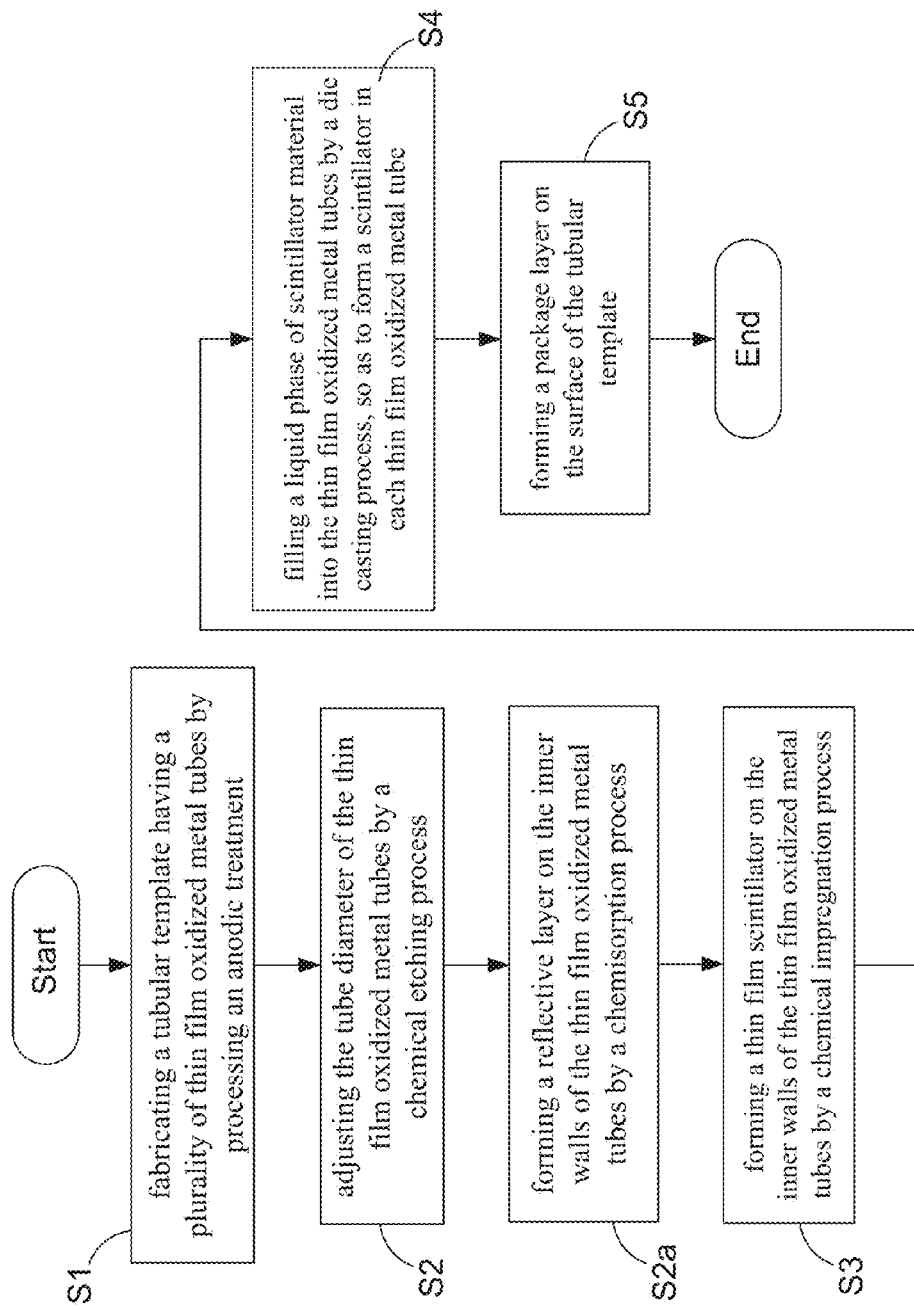
FIG. 2 is a flowchart of a method for manufacturing scintillator with sub-micron column structure according to the present invention.

Thus, through above descriptions, the framework and element constitution of the scintillator with sub-micron column structure of the present invention have been completely and clearly introduced; next, a method for manufacturing scintillator with sub-micron column structure will be described in follows. Please refer to FIG. 2, there is shown a flowchart of the method for manufacturing scintillator with sub-micron column structure according to the present invention. As shown in FIG. 2, this manufacturing method includes 6 primary steps of:

Step (S1), fabricating a tubular template 11 having a plurality of thin film oxidized metal tubes 113 by processing an anodic treatment;

Step (S2), adjusting the tube diameter of the thin film oxidized metal tubes 113 by a chemical etching process;

Step (S2a), forming a reflective layer on the inner walls of the thin film oxidized metal tubes 113 by a chemisorption process;

Step (S3), forming a thin film scintillator on the inner walls of the thin film oxidized metal tubes 113 by a chemical impregnation process;

Step (S4), filling a liquid phase of scintillator material into the thin film oxidized metal tubes 113 by a die casting process, so as to form a scintillator column 12 in each thin film oxidized metal tube 113; and Step (S5), forming a package layer 13 on the surface of the tubular template 11.

Figure 3:
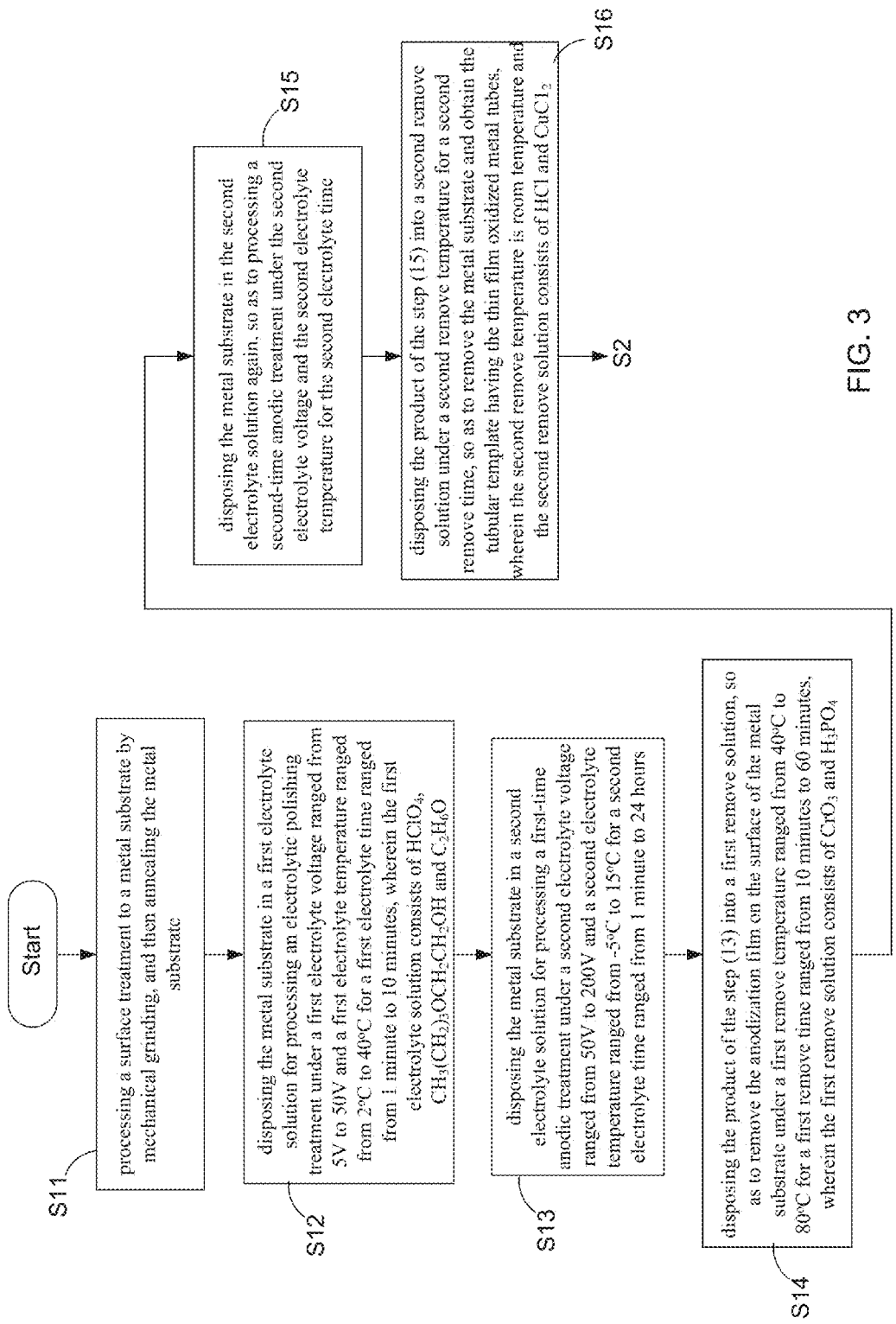
FIG. 3 is a detailed flowchart of step (S1)
Figure 4:
FIG. 4 is a schematic manufacturing process diagram of the scintillator with sub-micron column structure.
Figure 4:
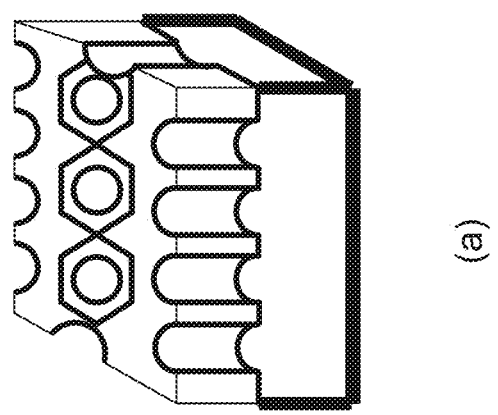
Figure 5:
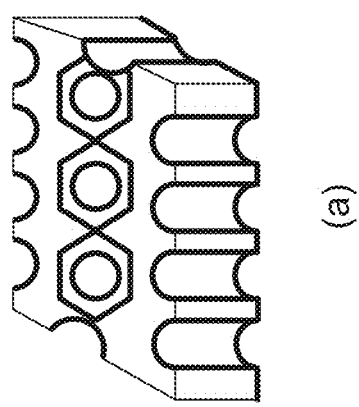
FIG. 5 is the schematic manufacturing process diagram of the scintillator with sub-micron column structure.
Figure 5:
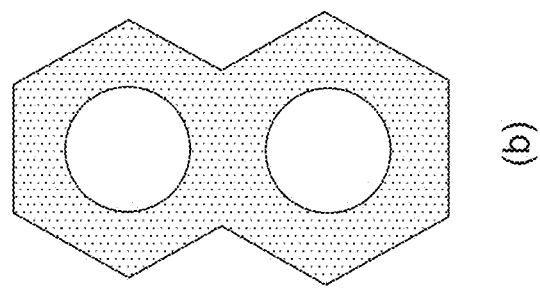

Please continuously refer to FIG. 3, which illustrates a detailed flowchart of the step (S1); moreover, please simultaneously refer to FIG. 4 and FIG. 5, there are shown schematic manufacturing process diagrams of the scintillator with sub-micron column structure. As shown in FIG. 3, the aforesaid step (S1) includes 6 detailed steps of:

Firstly, in step (S11), it processes a surface treatment to a metal substrate by mechanical grinding, and then anneals the metal substrate. Herein, an aluminum substrate is exemplarily used as the metal substrate for further describing the step (S11): using a sandpaper machine to mechanically grind the aluminum substrate from 400# sandpaper to 2000# sandpaper, and then disposing the aluminum substrate in an atmosphere furnace for annealing under 550° C. for 1 hr.

Next, in step (S12), it disposes the metal substrate in a first electrolyte solution for processing an electrolytic polishing treatment under a first electrolyte voltage and a first electrolyte temperature for a first electrolyte time. Similarly, the aluminum substrate is exemplarily used as the metal substrate for further describing the step (S12): disposing the aluminum substrate in the first electrolyte solution consisting of 5~20% $HClO_4$, 5~20% $CH_3(CH_2)_3OCH_2CH_2OH$ and 60~90% $C_2H_6O$ under the first electrolyte voltage of 5V~50V and the first electrolyte temperature of 2° C.~40° C. for the first electrolyte time of 1 min~10 min. Moreover, it needs to further explain that the best conditions for the electrolytic polishing treatment in aforesaid step (S12) include: the electrolyte solution consisting of 15% $HClO_4$, 15% $CH_3(CH_2)_3OCH_2CH_2OH$ and 70% $C_2H_6O$, the first electrolyte voltage of 40V, the first electrolyte temperature of 25° C., and the first electrolyte time of 90 seconds.

In step (S13), it disposes the metal substrate in a second electrolyte solution for processing a first-time anodic treatment under a second electrolyte voltage and a second electrolyte temperature for a second electrolyte time. Similarly, the aluminum substrate is exemplarily used as the metal substrate for further describing the step (S13): disposing the aluminum substrate in the second electrolyte solution consisting of 1~10 vol % $H_3PO_4$ for processing the first-time anodic treatment under the second electrolyte voltage of 50V~200V and the second electrolyte temperature of −5° C.~15° C. for the second electrolyte time of 1 min~24 hr. Moreover, the best conditions for the first-time anodic treatment in aforesaid step (S13) include: the second electrolyte solution consisting of 1 vol % $H_3PO_4$, the second electrolyte voltage of 180V, the second electrolyte temperature of 0° C., and the second electrolyte time of 20 min.

In step (S14), it disposes the product of the step (S13) into a first remove solution, so as to remove the anodization film on the surface of the metal substrate under a first remove temperature for a first remove time. Similarly, the aluminum substrate is exemplarily used as the metal substrate for further describing the step (S14): disposing the product of the step (S13) into the first remove solution consisting of 1~5 wt % $CrO_3$ and 1~15 vol % $H_3PO_4$, so as to remove the thin film oxidized aluminum on the surface of the aluminum substrate under the first remove temperature of 40° C.~80° C. for the first remove time of 10 min~60 min. Moreover, the best conditions for the first-time anodic treatment in aforesaid step (S14) include: the first remove solution consisting of 1.8 wt % $CrO_3$ and 6 vol % $H_3PO_4$, the first remove temperature of 60° C. and the first remove time of 30 min.

In step (S15), it disposes the metal substrate in the second electrolyte solution again, so as to processing a second-time anodic treatment under the second electrolyte voltage and the second electrolyte temperature for the second electrolyte time. The process conditions of the second-time anodic treatment in step (S15) are the same to the first-time anodic treatment in step (S13); moreover, when processing the second-time anodic treatment, the thickness of thin film oxidized aluminum on the surface of the aluminum substrate increases with the processing electrolyte time, and the growth rate of thin film oxidized aluminum thickness is around 6 μm/hr. As shown in FIG. 4(a) and FIG. 4(b), the stereo diagram and the side view of the metal substrate been processed twice anodic treatments is illustrated.

As shown in FIG. 4, the thin film oxidized aluminum on the surface of the aluminum substrate presents a regular cell shape or a nano tube structure, and there is a barrier layer formed at the interface of the nano tube terminal and the aluminum substrate. This thin film oxidized aluminum is also called as anodic aluminum oxide (AAO), anodic alumina nanoholds (AAN), anodic alumina membrane (AAM), or porous anodic alumina (PAA). In the present invention, the anodic treatment is completed through the reaction formula of $2Al^{+3}+3H_2O \rightarrow Al_2O_3+6H^+$, moreover, the pH value of the electrolyte solution must be controlled for being smaller than 4 (i.e., the electrolyte solution must be an acidic solution), and the applied voltage needs to be controlled for being greater than −1.8V (i.e., the applied voltage must be greater than standard hydrogen electrode potential (SHE)). Besides, $H^+$ in above-mentioned reaction formula would become $H_2$ gas by $H^+ + H^+ \rightarrow H_2$, wherein the $H_2$ gas may flow out of the thin film oxidized aluminum ($Al_2O_3$), so as to facilitate the formation of a porous thin film oxidized aluminum (i.e., the porous AAO). Therefore, it is able to know that the thin film oxidized aluminum having a plurality of apertures with uniform pore size can be manufactured by controlling the flow out rate of $H_2$ gas.

To make more descriptions for thin film oxidized aluminum having apertures, the thin film oxidized aluminum (i.e., $Al_2O_3$ thin film) grows upwards by hexagonal pores type in the beginning; moreover, these hexagonal pores are then transformed to circular pores because the arrangement of the atoms around the hexagonal pores gets to disorder with the increase of the anodic treatment time. The change of the pore size can be calculated by formula of C=mV, where C presents the pore size, V presents the anodic treatment voltage and m is a constant (2~2.5). Generally, if the thin film oxidized aluminum on the surface of the aluminum substrate presents a regular cell structure with the pore size smaller than 100 nm, the thin film oxidized aluminum is then called nano oxidized aluminum tubes; Or, if the thin film oxidized aluminum on the surface of the aluminum substrate presents a regular cell structure with the pore size greater than 100 nm, the thin film oxidized aluminum is then called sub-micron oxidized aluminum tubes. In the present invention, the tube diameter of the thin film oxidized aluminum tubes can be controlled by using different manufacturing parameters; for example the thin film oxidized aluminum tubes with 8 nm tube diameter can be fabricated by using $H_2SO_4$ as anodic treatment solution, and the thin film oxidized aluminum tubes with 500 nm tube diameter can be made by using $H_3PO_4$ as anodic treatment solution.

Figure 6:
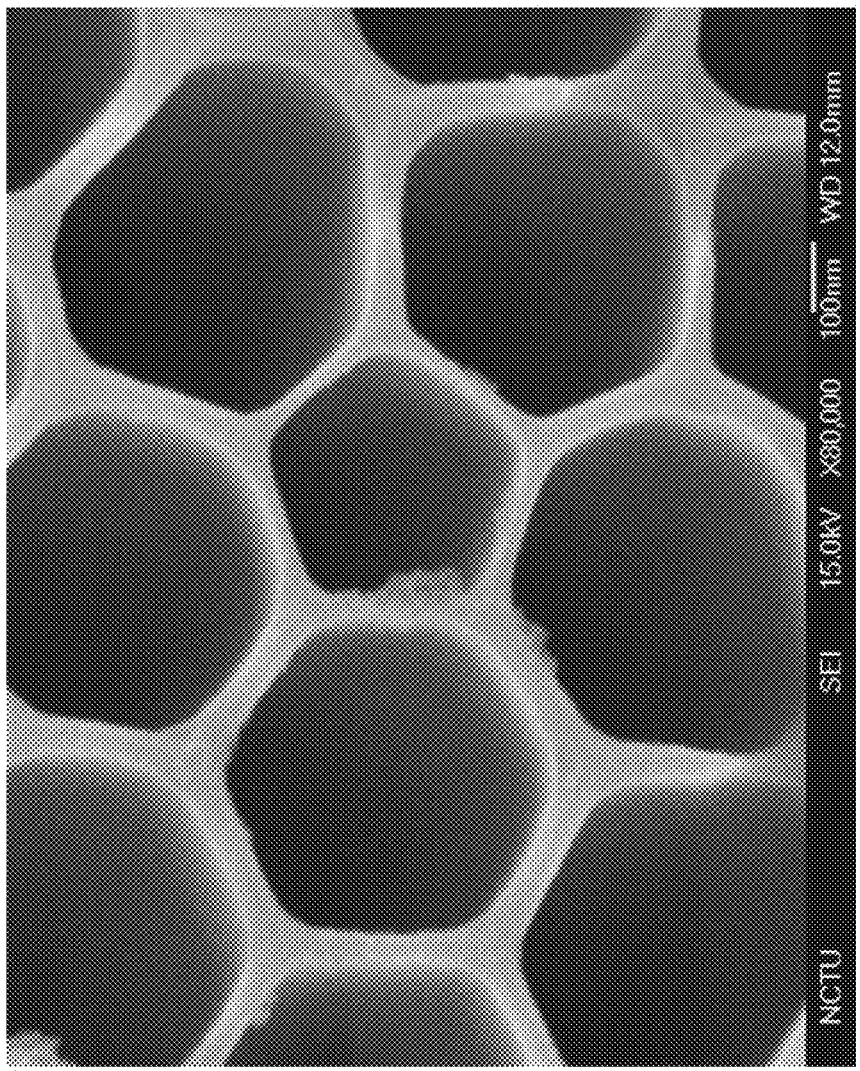
FIG. 6 is a microstructure image of anodic aluminum oxide tubes with tube diameter of 500 nm.

Finally, in step (S16), it disposes the product of the step (S15) into a second remove solution for a second remove temperature, so as to remove the metal substrate and obtain the tubular template having the thin film oxidized metal tubes. As shown in FIG. 5(a), the stereo diagram of the tubular template is illustrated, and FIG. 5(b) shows the tube diameter of this tubular template. Similarly, the aluminum substrate is exemplarily used as the metal substrate for further describing the step (S16): disposing the product of the step (S15) into a second remove solution consisting of HCl and $CuCl_2$ under room temperature for a few minutes, and the microstructure image of the obtained tubular template having the thin film oxidized metal tubes (i.e., the thin film oxidized metal tubes 113) is shown in FIG. 6, wherein the tube diameter of the thin film oxidized metal tubes is 500 nm.

Figure 7:
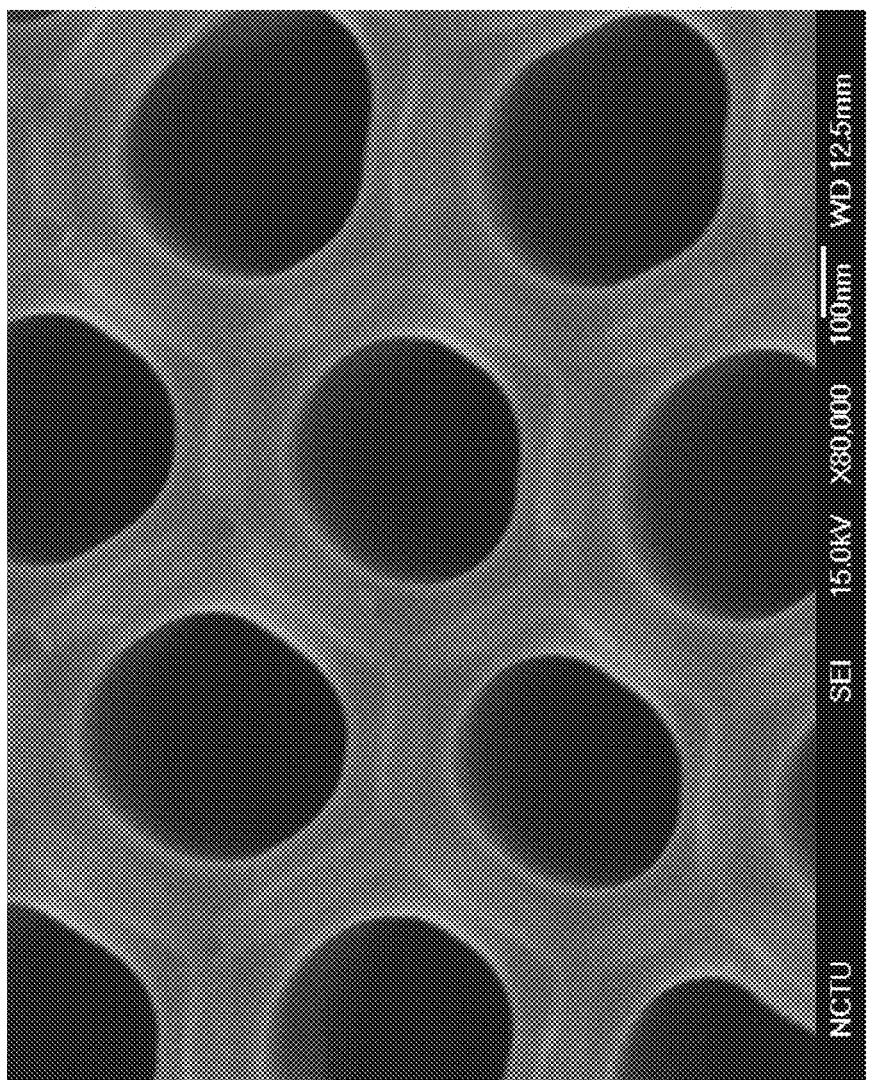
FIG. 7 is a microstructure image of anodic aluminum oxide tubes with tube diameter of 350 nm.
Figure 8:
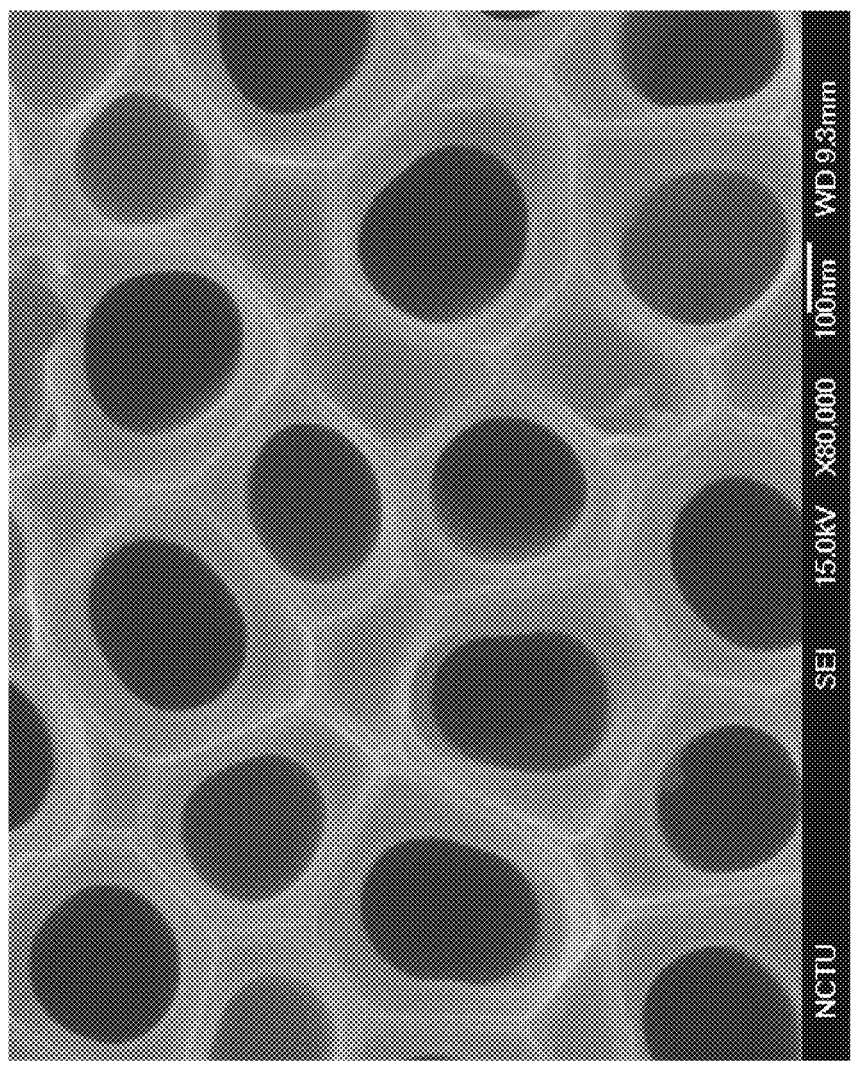
FIG. 8 is a microstructure image of anodic aluminum oxide tubes with tube diameter of 250 nm.

Thus, the step (S1) of the manufacturing method is carried out and the tubular template 11 consists of the thin film oxidized metal tubes 113 is obtained by finishing abovementioned step (S11)~step (S16); next, the tube diameter of the thin film oxidized metal tubes 113 can be adjusted in step (S2) through the chemical etching process. In the present invention, the step (S2) includes the detailed steps of step (S21), disposing the tubular template 11 in a micro-structure modulation solution; and step (S22), adjusting the tube diameter of the thin film oxidized metal tubes 113 under a micro-structure modulation temperature for a micro-structure modulation time. Similarly, the aluminum substrate is exemplarily used as the metal substrate for further describing the steps (S21) and (S22): taking 5 vol % $H_3PO_4$ as the micro-structure modulation solution and using the micro-structure modulation temperature of 25° C. and the micro-structure modulation time of 2.5 hr as operation conditions, so as to adjust the tube diameter of the thin film oxidized aluminum tubes (AAO) shown in FIG. 6, and then obtain the thin film oxidized aluminum tubes with the tube diameter of 350 nm shown in FIG. 7. Or, taking 5 vol % $H_3PO_4$ as the micro-structure modulation solution and using the micro-structure modulation temperature of 25° C. and the micro-structure modulation time of 1 hr as operation conditions, so as to adjust the tube diameter of the thin film oxidized aluminum tubes (AAO) shown in FIG. 6, and then obtain the thin film oxidized aluminum tubes with the tube diameter of 250 nm shown in FIG. 8.

Moreover, in the method for manufacturing scintillator with sub-micron column structure of the present invention, by modulating the manufacturing parameters and conditions of the first-time anodic treatment in step (S13), the second-time anodic treatment in step (S15), and the tube diameter adjusting process in step (S2), the tube diameter, the thickness and the tube density of thin film oxidized aluminum tubes (i.e., the thin film oxidized metal tubes 113 of the tubular template 11) can be controlled to 10~500 nm, 0.1~1000 μm and $10^8$~$10^{12}$ tube/$cm^2$, respectively.

Figure 9:
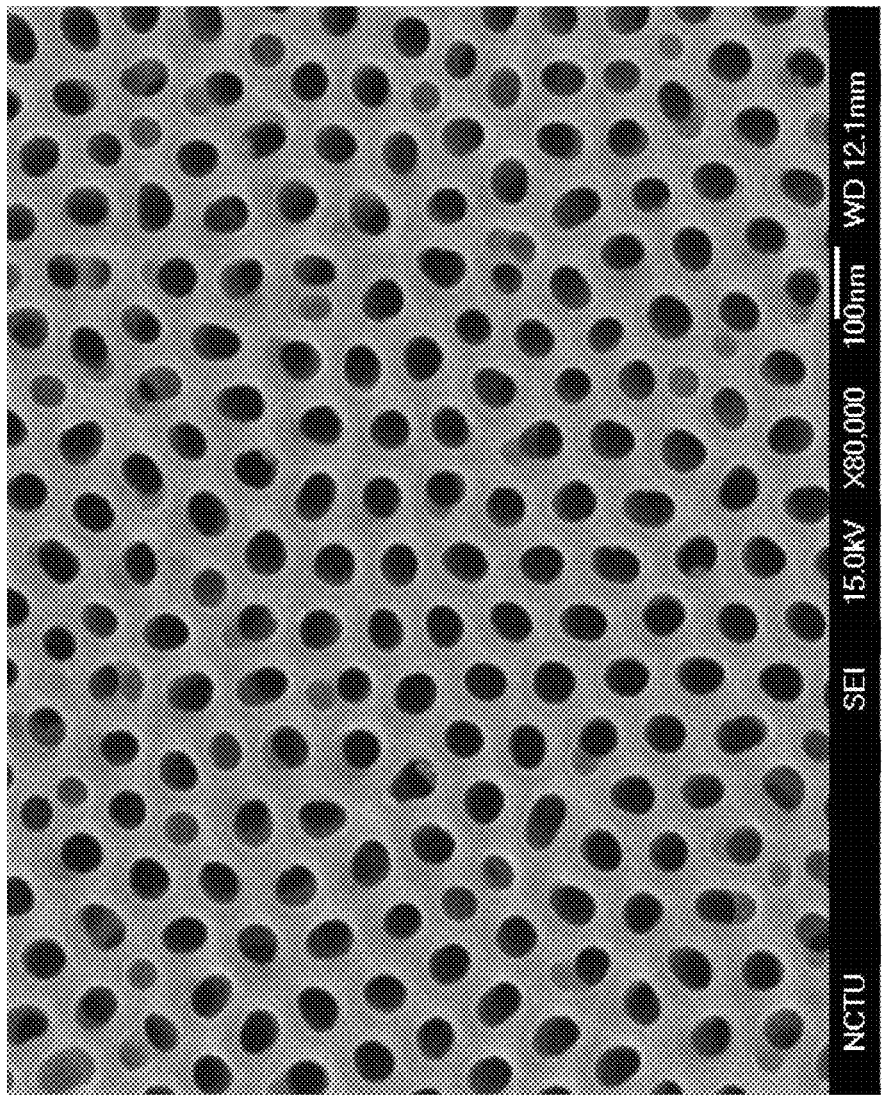
FIG. 9 is a microstructure image of anodic aluminum oxide tubes with tube diameter of 70 nm.
Figure 10:
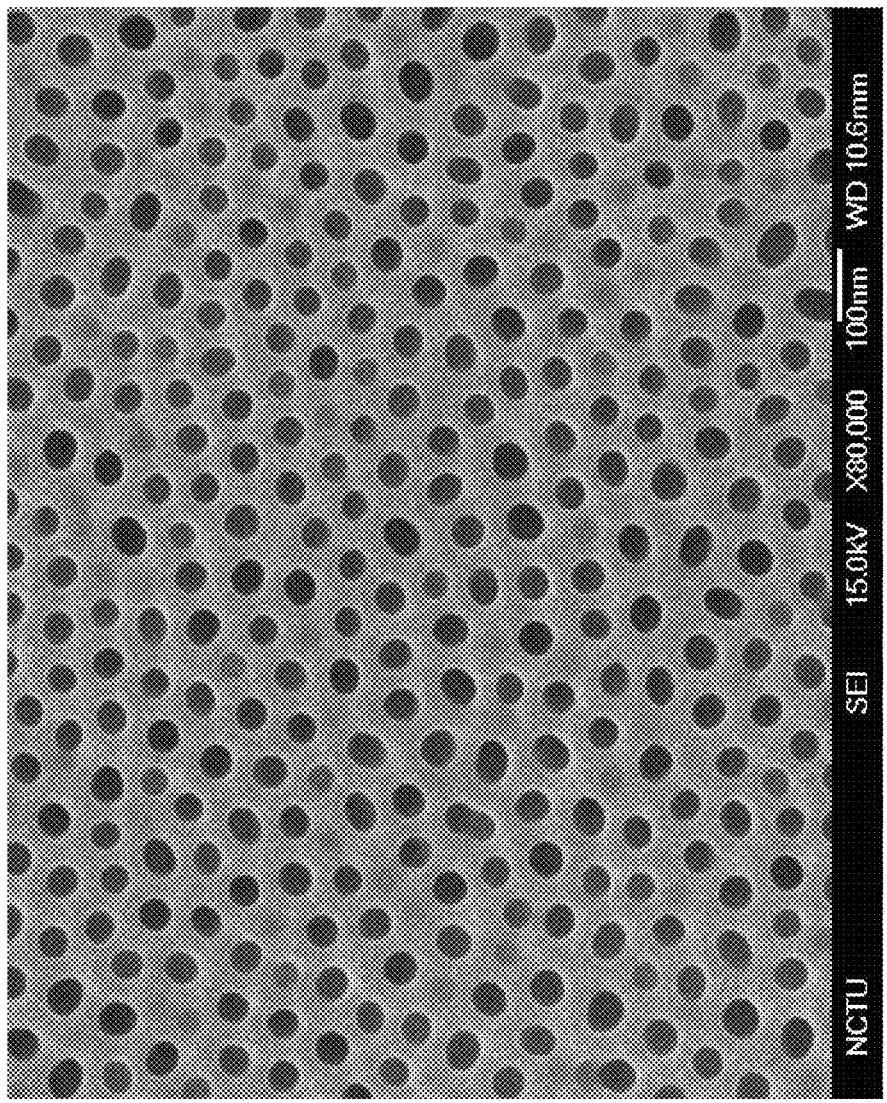
FIG. 10 is a microstructure image of anodic aluminum oxide tubes with tube diameter of 40 nm.
Figure 11:
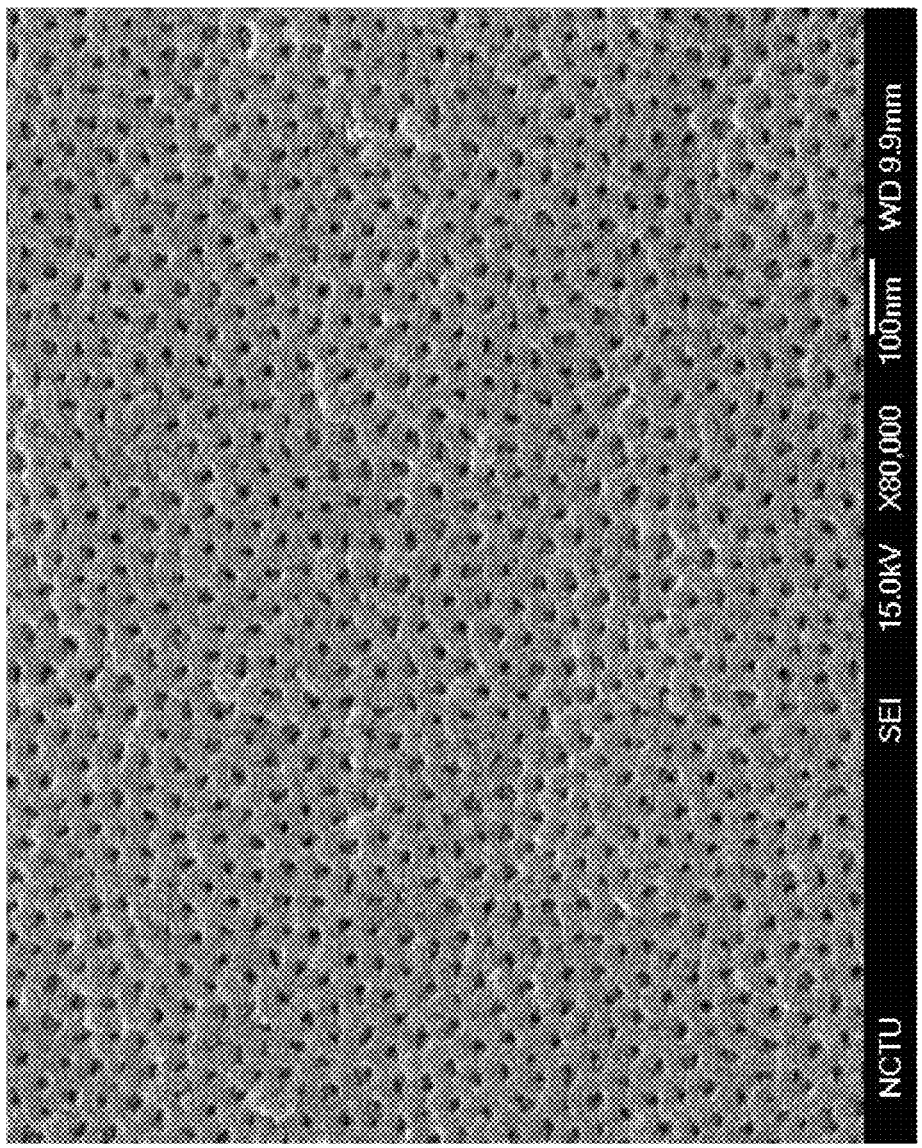
FIG. 11 is a microstructure image of anodic aluminum oxide tubes with tube diameter of 10 nm.

Please refer to FIG. 9, FIG. 10 and FIG. 11, there are shown microstructure images of anodic aluminum oxide tubes with tube diameter of 70 nm, 40 nm and 10 nm. The manufacturing parameters and conditions of the first-time anodic treatment in step (S13), the second-time anodic treatment in step (S15), and the tube diameter adjusting process in step (S2) for making the anodic aluminum oxide tubes shown in FIG. 9, FIG. 10 and FIG. 11 are listed in following table 2

TABLE 2

| | anodic aluminum oxide tubes of FIG. 9 | anodic aluminum oxide tubes of FIG. 10 | anodic aluminum oxide tubes of FIG. 11 |
|---|---|---|---|
| Step (S13) | taking 3 wt % $C_2H_2O_4$ as the electrolyte solution, and using the electrolyte voltage of 40 V, the electrolyte temperature of 25° C., and the electrolyte time of 20 min as the anodic treatment conditions. | taking 3 wt % $C_2H_2O_4$ as the electrolyte solution, and using the electrolyte voltage of 40 V, the electrolyte temperature of 25° C., and the electrolyte time of 20 min as the anodic treatment conditions. | taking 10 vol % $H_2SO_4$ as the electrolyte solution, and using the electrolyte voltage of 18 V, the electrolyte temperature of 15° C., and the electrolyte time of 20 min as the anodic treatment conditions. |
| Step (S15) | the growth rate of thin film oxidized aluminum thickness is around 10 μm/hr. | the growth rate of thin film oxidized aluminum thickness is around 10 μm/hr. | the growth rate of thin film oxidized aluminum thickness is around 8 μm/hr. |
| Step (S2) | taking 5 vol % $H_3PO_4$ as the micro-structure modulation solution and using the micro-structure modulation temperature of 25° C. and the micro-structure modulation time of 60 min as the operation conditions. | taking 5 vol % $H_3PO_4$ as the micro-structure modulation solution and using the micro-structure modulation temperature of 25° C. and the micro-structure modulation time of 10 min as the operation conditions. | taking 5 vol % $H_3PO_4$ as the micro-structure modulation solution and using the micro-structure modulation temperature of 25° C. and the micro-structure modulation time of 5 min as the operation conditions. |

Thus, FIG. 9 shows the microstructure image of anodic aluminum oxide ($Al_2O_3$) tubes with tube diameter of 70 nm, FIG. 10 shows the microstructure image of anodic aluminum oxide ($Al_2O_3$) tubes with tube diameter of 40 nm, and FIG. 11 shows the microstructure image of anodic aluminum oxide ($Al_2O_3$) tubes with tube diameter of 10 nm.

In addition, it needs to further describe that, besides the aluminum substrate, titanium substrate can also be used as the metal substrate for making the tubular template 11 consisting of the thin film oxidized metal tubes 113 by the following manufacturing steps:

Firstly, limiting the surface area of the titanium substrate under process by using a mould; next, processing an electrolytic polishing treatment to the limited surface area of the titanium substrate, wherein the electrolyte solution consists of 5~10% $HClO_4$, 10~50 vol % $CH_3(CH_2)_3OCH_2CH_2OH$ and 40~85% $CH_3OH$, and the operation conditions include: the electrolyte voltage of 5V~60V, the electrolyte temperature of 2° C.~40° C., and the electrolyte time of 1 min~10 min. Moreover, the best manufacturing parameters and conditions for the electrolytic polishing treatment include: the electrolyte solution consisting of 5 vol % $HClO_4$, 42 vol % $CH_3(CH_2)_3OCH_2CH_2OH$ and 53 vol % $CH_3OH$, the electrolyte voltage of 52V, the electrolyte temperature of 25° C., and the electrolyte time of 3 min.

Continuously, disposing the polished titanium substrate in the mould for processing anodic treatment by using constant voltage and current, so as to form the oxidized titanium ($TiO_2$) on the titanium substrate; wherein the electrolyte solution for anodic treatment consists of 0.4 wt % $NH_4F$, 2 vol % $H_2O$ and 98 vol % $HOCH_2CH_2OH$, and the operation conditions include: the constant voltage of 60V and the anodic treatment of 1 hr for first-time anodic treatment, and the constant current of 0.85 A and the anodic treatment of 3 hr for second-time anodic treatment.

Figure 12:
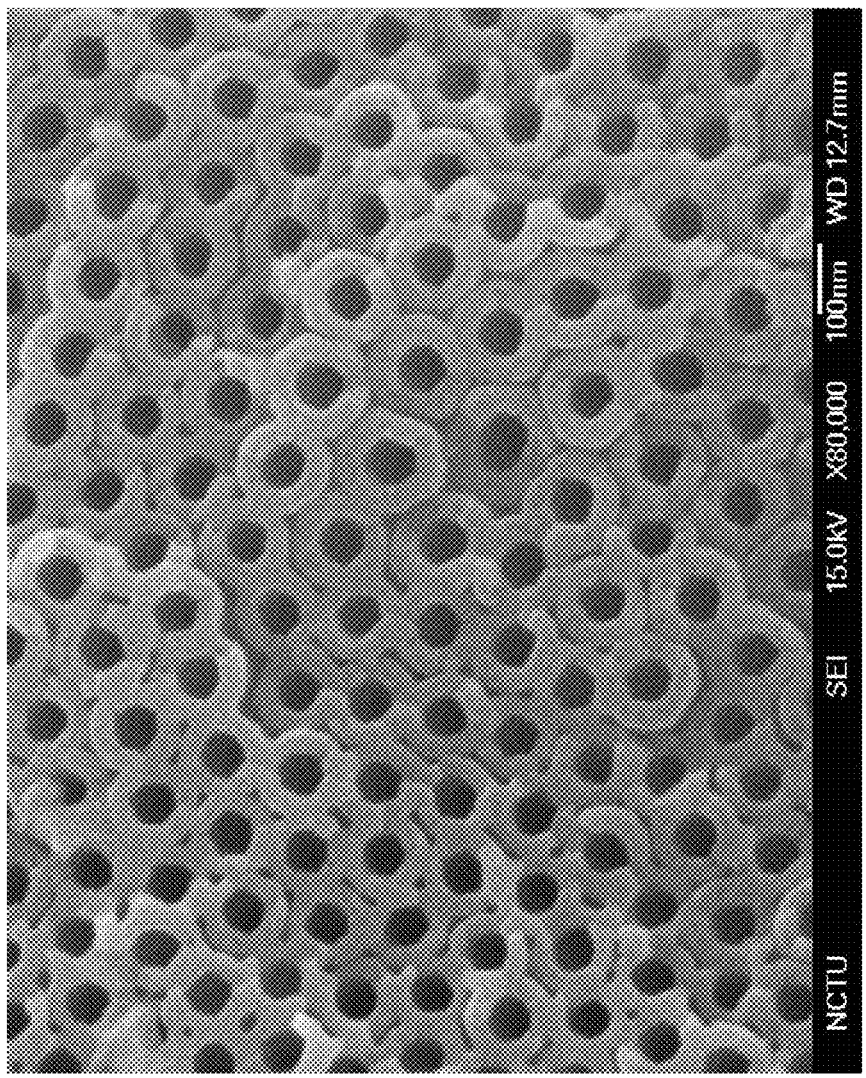
FIG. 12 is a microstructure image of anodic titanium oxide tubes with tube diameter of 90 nm.

After completing the anodic treatment, the remaining electrolyte solution on the oxidized titanium ($TiO_2$) is washed and removed by ethanol, and then baking the oxidized titanium ($TiO_2$) for removing the residual liquid in the thin film oxidized titanium tubes of the $TiO_2$. Thus, as the present of the microstructure image in FIG. 12, the anodic oxidized titanium ($TiO_2$) having the thin film oxidized titanium tubes with tube diameter of 90 nm can be used as the tubular template 11 of the scintillator with sub-micron column structure 1.

Therefore, after the tubular template 11 consisting of a plurality of thin film oxidized metal tubes 113 (i.e., the thin film oxidized aluminum tubes or the thin film oxidized titanium tubes) is fabricated; subsequently, for increasing the efficiency of the scintillators 12 to an external high-energy wave (for example, X-ray), the step (S2a) is adopted for forming a reflective layer on the inner walls of the thin film oxidized metal tubes 113 by the chemisorption process. The step (S2a) includes the detailed steps of:

Firstly, in step (S2a1), it disposes the tubular template 11 in a sensitization solution for treating sensitization process under a sensitization temperature for a sensitization time. Herein, the thin film oxidized aluminum is exemplarily used as the tubular template 11 for further describing the step (S2a1): disposing the tubular template 11 in the sensitization solution consisting of 0.1~3 wt % $SnCl_2$, 1~10 vol % HCl and $H_2O$ under a sensitization temperature of 10° C.~40° C. for the sensitization time of 0.5 min~30 min. Moreover, the best conditions for the sensitization process in aforesaid step (S2a1) include: the sensitization solution consisting of 0.3 wt % $SnCl_2$, 2.5 vol % HCl and $H_2O$, the sensitization temperature of 25° C., and the sensitization time of 3 min.

In step (2a2), it disposes the product of the step (S2a1) in an activation solution for treating activation process under an activation temperature for an activation time. Similarly, the thin film oxidized aluminum is exemplarily used as the tubular template 11 for further describing the step (S2a2): disposing the product of the step (S2a1) in an activation solution consisting of 0.1~5 wt % $PdCl_2$, 1~10 vol % HCl and $H_2O$ under the activation temperature of 10° C.~40° C. for the activation time of 0.5 min~30 min. Moreover, the best conditions for the activation process in aforesaid step (S2a2) include: the activation solution consisting of 0.1 wt % $PdCl_2$, 1.0 vol % HCl and $H_2O$, the activation temperature of 25° C., and the activation time of 3 min.

In step (S2a3), it disposes the product of the step (2a2) in an electro-less deposition solution for treating electro-less deposition process under an electro-less deposition temperature and an electro-less deposition pH value for an electro-less deposition time, so as to form the reflective layer on the inner walls of the thin film oxidized metal tubes 113. Similarly, the thin film oxidized aluminum is exemplarily used as the tubular template 11 for further describing the step (S2a3): disposing the product of the step (S2a2) in the electro-less deposition solution consisting of 0.5~10 wt % $NiSO_4$, 0.5~10 wt % $NaH_2PO_2$, 0.5~10 ppm $Pb(NO_3)_2$, and 0.5~10 wt % $Na_3C_6H_5O_7$ under the electro-less deposition temperature of 50° C.~90° C. and the electro-less deposition pH value of 4~5.5 for the electro-less deposition time of 1 min~60 min. Moreover, the best conditions for the electro-less deposition process in aforesaid step (S2a3) include: the electro-less deposition solution consisting of 2 wt % $NiSO_4$, 2 wt % $NaH_2PO_2$, 2 ppm $Pb(NO_3)_2$, and 2 wt % $Na_3C_6H_5O_7$, the electro-less deposition temperature of 70° C., the electro-less deposition pH value of 5, and the electro-less deposition time of 3~30 min.

Figure 13:
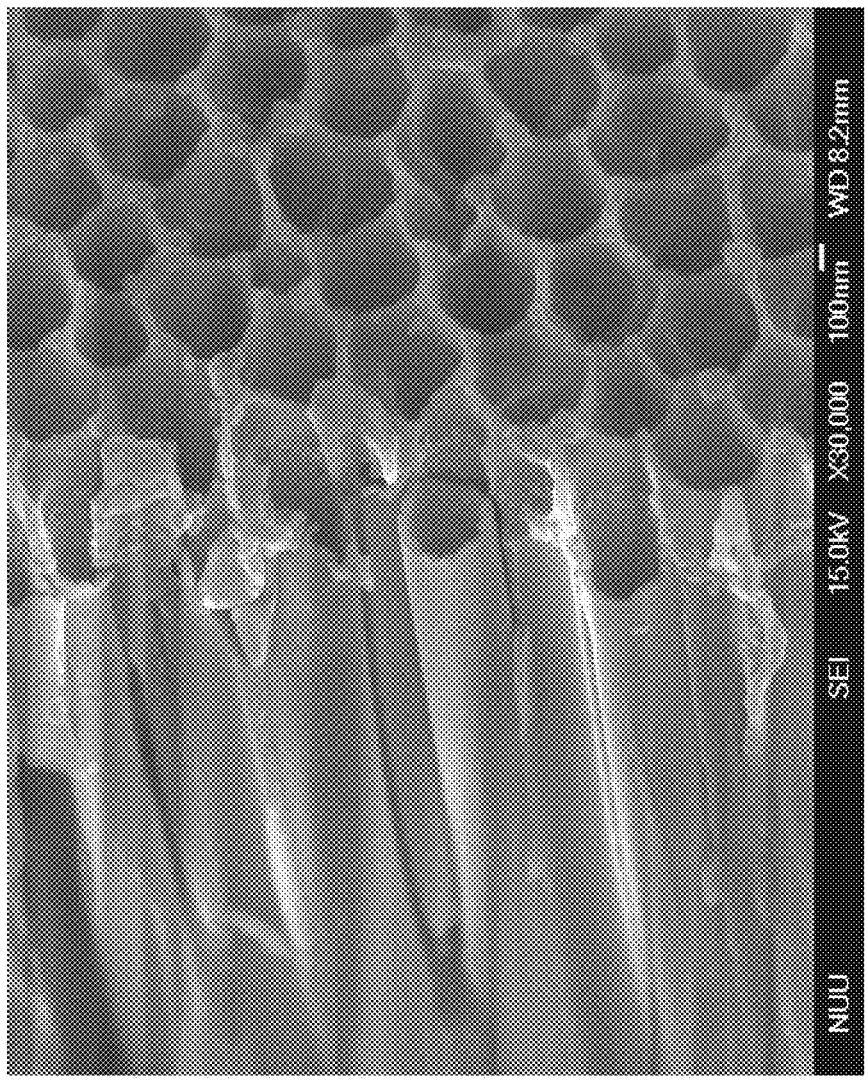
FIG. 13 is a microstructure image of nickel tubes formed on the inner walls of the anodic titanium oxide tubes.
Figure 14:
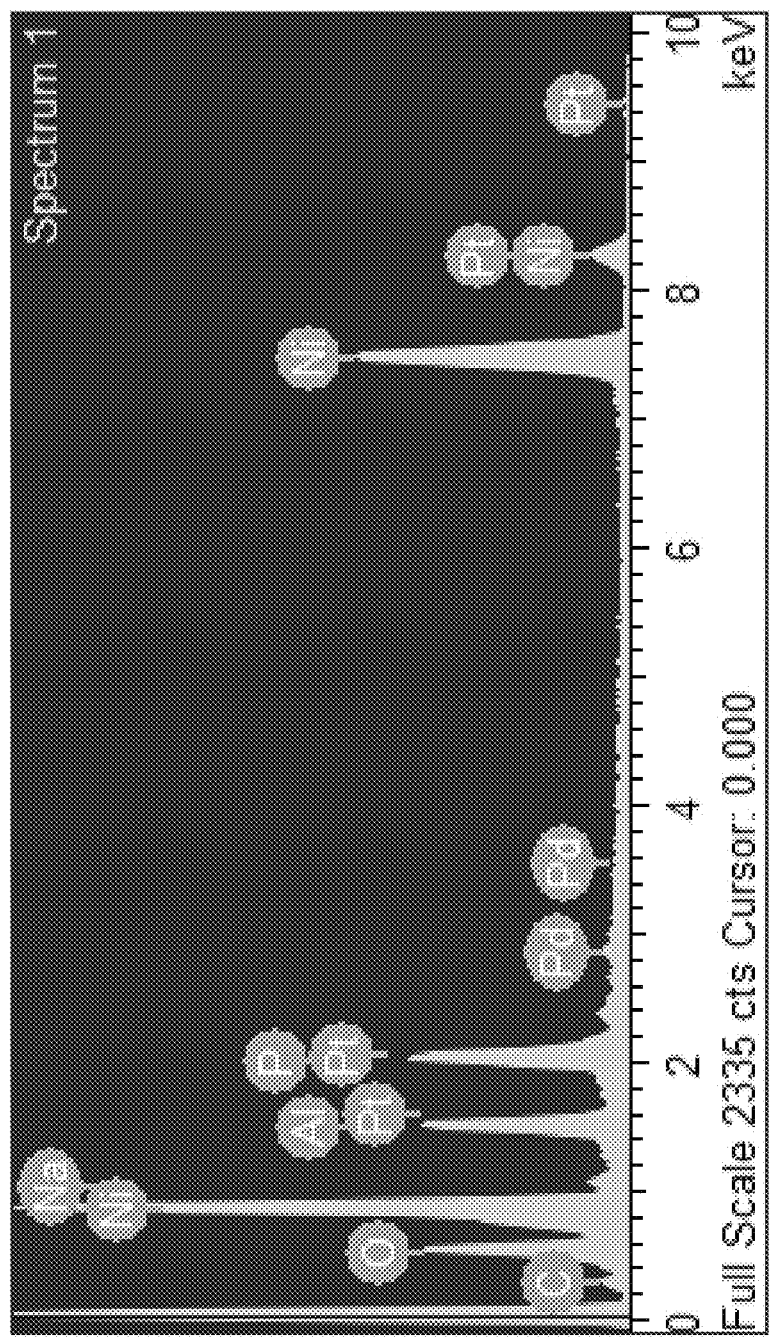
FIG. 14 is an EDS analysis plot of the nickel tubes formed on the inner walls of the anodic titanium oxide tubes.

Thus, by above-mentioned steps (S2a1)~(S2a3), the nickel tubes are formed and attached on the inner walls of the thin film oxidized aluminum ($Al_2O_3$) tubes 113 of the tubular template 11, and the microstructure image and the EDS (energy dispersive spectrometer) analysis plot are respectively shown in FIG. 13 and FIG. 14.

After the step (S2) is finished, the step (S3) is continuously used for forming a thin film scintillator on the inner walls of the thin film oxidized metal tubes 113 by a chemical impregnation process. The step (S3) includes the detailed steps of (S31) and (S32). In step (S31), it immerses the tubular template 11 in an aqueous solution for an immersion time, wherein the aqueous solution includes a scintillator material having a specific weight percent opposite to the aqueous solution. Then, in step (S32), it treats the tubular template 11 by thermal process, so as to remove the water in the thin film oxidized metal tubes 113.

Figure 15:
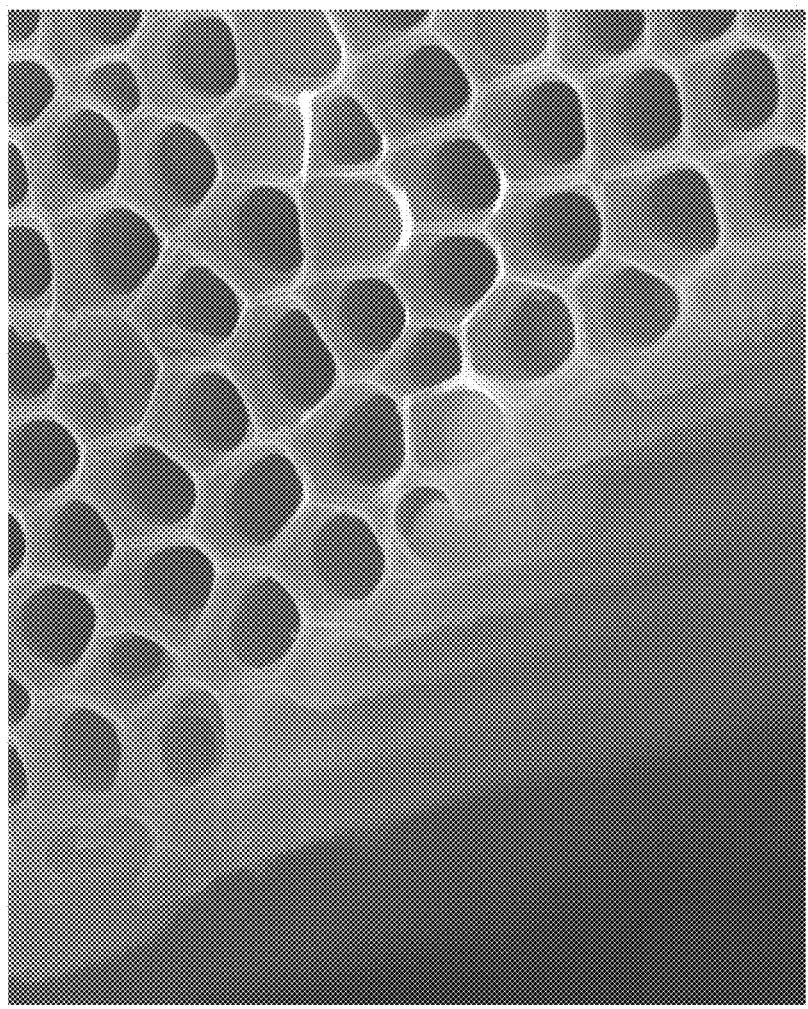
FIG. 15 is a microstructure image of CsI film formed on the inner walls of the anodic titanium oxide tubes.
Figure 16:
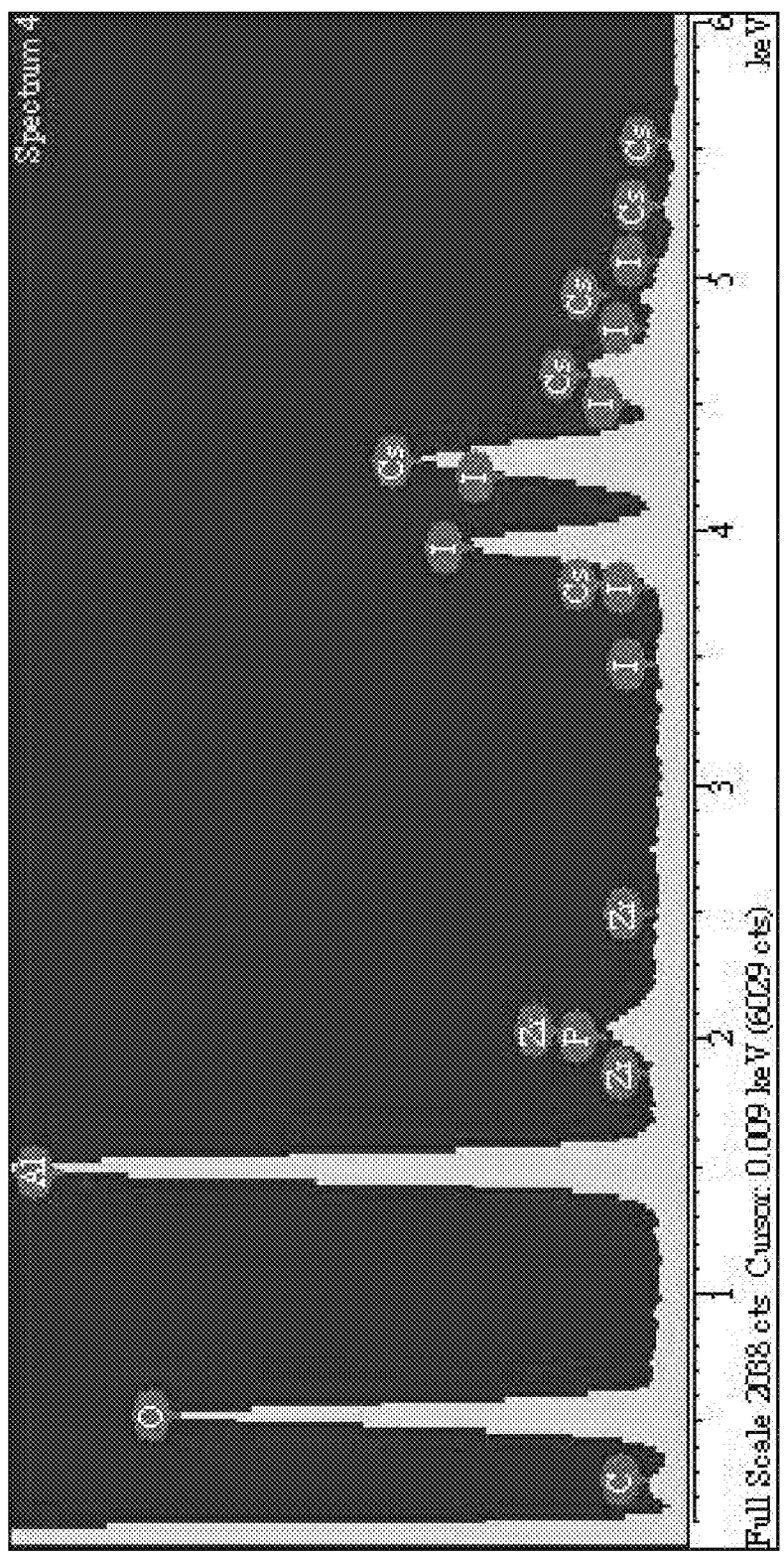
FIG. 16 is an EDS analysis plot of the CsI film formed on the inner walls of the anodic titanium oxide tubes.

Herein, the thin film oxidized aluminum is exemplarily used as the tubular template 11 for further describing the steps (S31) and (S32): immersing the thin film oxidized aluminum in the aqueous solution having 1~20 wt % CsI for 5 min~60 min, and then treating the thin film oxidized aluminum by thermal process under 100° C.~600° C. for 5 min~120 min, so as to remove the water in the thin film oxidized aluminum tubes. Moreover, the best conditions for the immersing treatment in aforesaid step (S31) include: the aqueous solution having 1 wt % CsI and the immersing time of 10 min; besides, the best conditions for the thermal process in aforesaid step (S32) include: the thermal temperature off 400° C. and the thermal time of 10 min. Thus, by above-mentioned steps (S31)~(S32), the thin film CsI are formed and attached on the inner walls of the thin film oxidized aluminum ($Al_2O_3$) tubes 113 of the tubular template 11, and the microstructure image and the EDS (energy dispersive spectrometer) analysis plot are respectively shown in FIG. 15 and FIG. 16.

After the step (S3) is finished, the step (S4) is continuously used for filling a liquid phase of scintillator material into the thin film oxidized metal tubes 113 by a die casting process, so as to form a scintillator column 12 in each thin film oxidized metal tube 113. The step (S4) includes the 4 detailed steps of:

Firstly, in step (S41), it disposes the powder of the scintillator material on the surface of the tubular template 11; next, in step (S42), it treats the product of step (S41) by thermal process, so as to make the melted scintillator material cover the surface of the tubular template 11. Subsequently, in step (S43), it permeates the melted scintillator material in to the thin film oxidized metal tubes 113 by using a die-casting mold; and eventually, in step (S44), it waits for the solidification of the melted scintillator material in the thin film oxidized metal tubes 113, and then a scintillator column 12 is formed in each thin film oxidized metal tube 113.

Similarly, the thin film oxidized aluminum is exemplarily used as the tubular template 11 for further describing the steps (S41)~(S44), disposing the CsI (or CsI doped with Tl) power on the surface of the thin film oxidized aluminum, and then heating the thin film oxidized aluminum until the thermal temperature reaches 650° C. (650° C. is greater than the melting point (621° C.) of the CsI) for making the melted CsI cover the thin film oxidized aluminum; and next to permeate the melted CsI in to the thin film oxidized aluminum tubes of the oxidized aluminum by using the die-casting mold; eventually, after the solidification of the melted CsI is completed, the CsI column is formed in each thin film oxidized aluminum tube.

Finally, for protecting the scintillators 12 from being damaged by water vapor and oxygen, a package layer is formed on the surface of the tubular template 11 via the step (S5). In the present invention, the material of the package layer 13 can be polymer, metal, ceramic, and combination thereof, and which is formed on the surface of the tubular template by spin coating, vapor deposition, sputtering, and combination process thereof.

Therefore, the above descriptions have been clearly and completely introduced the scintillator with sub-micron column structure and the manufacturing method thereof of the present invention; in summary, the present invention has the following advantages:

1. In the present invention, it utilizes anodic treatment and die casting technology with low cost and rapid production to manufacture a high-value scintillator with sub-micron column structure, and this scintillator with sub-micron column structure can also be manufactured by mass production.

2. By using the manufacturing method proposed by the present invention, the scintillator with sub-micron column structure or nano column structure can be made for being applied in medical equipments, nuclear medicine, and security detection technologies.

3. Inheriting to above point 2, the thin film oxidized metal tubes of the tubular template can be further manufactured to nano tubes by adjusting electrolyte composition, electrolysis voltage, and processing time of anodic treatment, and the aperture size, the thickness and the vessel density of the nano tube can be controlled and ranged from 10 nm to 500 nm, 0.1 μm to 1000 μm, and $10^8$ to $10^{12}$ tube/$cm^2$, respectively.

The above description is made on embodiments of the present invention. However, the embodiments are not intended to limit scope of the present invention, and all equivalent implementations or alterations within the spirit of the present invention still fall within the scope of the present invention.

We claim:
1. A method for manufacturing a scintillator with sub-micron column structure, comprising the steps of:
  (1) fabricating a tubular template having a plurality of thin film oxidized metal tubes by processing an anodic treatment;

(2) adjusting the tube diameter of the thin film oxidized metal tubes by a chemical etching process;
(3) forming a thin film scintillator on the inner walls of the thin film oxidized metal tubes by a chemical impregnation process;
(4) filling a liquid phase of scintillator material into the thin film oxidized metal tubes by a die casting process, so as to form a scintillator in each thin film oxidized metal tube; and
(5) forming a package layer on the surface of the tubular template.

2. The method for manufacturing the scintillator with sub-micron column structure of claim 1, further comprising a step (2a) between the step (2) and the step (3), used for forming a reflective layer on the inner walls of the thin film oxidized metal tubes by a chemisorption process.

3. The method for manufacturing the scintillator with sub-micron column structure of claim 1, wherein the step (1) comprises the detailed steps of:
(11) processing a surface treatment to a metal substrate by mechanical grinding, and then annealing the metal substrate;
(12) disposing the metal substrate in a first electrolyte solution for processing an electrolytic polishing treatment under a first electrolyte voltage ranged from 5V to 50V and a first electrolyte temperature ranged from 2° C. to 40° C. for a first electrolyte time ranged from 1 minute to 10 minutes, wherein the first electrolyte solution comprises: $HClO_4$, $CH_3(CH_2)_3OCH_2CH_2OH$ and $C_2H_6O$;
(13) disposing the metal substrate in a second electrolyte solution for processing a first-time anodic treatment under a second electrolyte voltage ranged from 50V to 200V and a second electrolyte temperature ranged from −5° C. to 15° C. for a second electrolyte time ranged from 1 minute to 24 hours;
(14) disposing the product of the step (13) into a first remove solution, so as to remove the anodization film on the surface of the metal substrate under a first remove temperature ranged from 40° C. to 80° C. for a first remove time ranged from 10 minutes to 60 minutes, wherein the first remove solution comprises: $CrO_3$ and $H_3PO_4$;
(15) disposing the metal substrate in the second electrolyte solution again, so as to perform a second anodic treatment under the second electrolyte voltage and the second electrolyte temperature for the second electrolyte time; and
(16) disposing the product of the step (15) into a second remove solution under a second remove temperature for a second remove time, so as to remove the metal substrate and obtain the tubular template having the thin film oxidized metal tubes, wherein the second remove temperature is room temperature and the second remove solution comprises: HCl and $CuCl_2$.

4. The method for manufacturing the scintillator with sub-micron column structure of claim 3, wherein the composition of the second electrolyte solution is selected from the group comprising: $H_2SO_4$, $H_2CrO_4$, $C_2H_2O_4$, HF, $H_3PO_4$, $NH_4F$, and mixtures thereof.

5. The method for manufacturing the scintillator with sub-micron column structure of claim 1, wherein the material of the thin film oxidized metal tubes is selected from the group consisting of: $ZrO_2$, $TiO_2$, $Al_2O_3$, $Ta_3O_5$, $ZrO_2$, and $Nb_2O_3$.

6. The method for manufacturing the scintillator with sub-micron column structure of claim 1, wherein the step (2) comprises the detailed steps of:
(21) disposing the tubular template in a micro-structure modulation solution; and
(22) adjusting the tube diameter of the thin film oxidized metal tubes under a micro-structure modulation temperature ranged from 20° C. to 80° C. for a micro-structure modulation time ranged from 0.5 hour to 5 hours.

7. The method for manufacturing the scintillator with sub-micron column structure of claim 6, wherein the composition of the micro-structure modulation solution is selected from the group comprising: $H_2SO_4$, $H_2CrO_4$, $C_2H_2O_4$, HF, $H_3PO_4$, $NH_4F$, and mixtures thereof.

8. The method for manufacturing the scintillator with sub-micron column structure of claim 2, wherein the step (2a) comprises the detailed steps of:
(2a1) disposing the tubular template in a sensitization solution for treating with a sensitization process under a sensitization temperature for a sensitization time, wherein the sensitization temperature is ranged from 10° C. to 40° C., and the sensitization time being ranged from 0.5 minute to 30 minutes;
(2a2) disposing the product of the step (2a1) in an activation solution for treating with an activation process under an activation temperature for an activation time, wherein the activation temperature is ranged from 10° C. to 40° C., and the activation time being ranged from 0.5 minute to 30 minutes; and
(2a3) disposing the product of the step (2a2) in an electro-less deposition solution for treating with an electro-less deposition process under an electro-less deposition temperature and an electro-less deposition pH value for an electro-less deposition time, so as to form the reflective layer on the inner walls of the thin film oxidized metal tubes, wherein the electro-less deposition temperature is ranged from 50° C. to 90° C., the electro-less deposition time being ranged from 1 minute to 60 minutes, and the electro-less deposition pH value is ranged from 4 to 5.5.

9. The method for manufacturing the scintillator with sub-micron column structure of claim 8, wherein the composition of the sensitization solution consists of $SnCl_2$, HCl and $H_2O$.

10. The method for manufacturing the scintillator with sub-micron column structure of claim 8, wherein the composition of the activation solution consists of $PdCl_2$, HCl and $H_2O$.

11. The method for manufacturing the scintillator with sub-micron column structure of claim 8, wherein the composition of the electro-less deposition solution comprises: $NiSO_4$, $NaH_2PO_2$, $Pb(NO_3)_2$, and $Na_3C_6H_5O_7$.

12. The method for manufacturing the scintillator with sub-micron column structure of claim 1, wherein the step (3) comprises the detailed steps of:
(31) immersing the tubular template in an aqueous solution for an immersion time, wherein the aqueous solution includes a scintillator material having a specific weight percent opposite to the aqueous solution; and
(32) treating the tubular template by a thermal process, so as to remove the water in the thin film oxidized metal tubes.

13. The method for manufacturing the scintillator with sub-micron column structure of claim 1, wherein the step (4) comprises the detailed steps of:

(41) disposing the powder of the scintillator material on the surface of the tubular template;
(42) treating the product of step (41) by a thermal process, so as to make the liquid phase of scintillator material cover the surface of the tubular template;
(43) permeating the liquid phase of scintillator material into the thin film oxidized metal tubes by using a die-casting mold; and
(44) waiting for the solidification of the liquid phase of scintillator material in the thin film oxidized metal tubes to form a scintillator column in each of the thin film oxidized metal tubes.

14. The method for manufacturing the scintillator with sub-micron column structure of claim 1, wherein the material of the package layer of the step (5) is the material selected from the group consisting of polymer, metal, ceramic, and combinations thereof, and is formed on the surface of the tubular template by a processing way selected from the group consisting of spin coating, vapor deposition, sputtering, and combinations thereof.

* * * * *